United States Patent Office 3,246,057
Patented Apr. 12, 1966

1

3,246,057

PROCESS FOR LAYING TERRAZZO

Anthony J. Simonson, Yardley, Pa., assignor to Thiokol Chemical Corporation, Bristol, Pa.

No Drawing. Filed Mar. 31, 1961, Ser. No. 118,748
19 Claims. (Cl. 264—35)

This invention relates to a novel process for laying terrazzo. In particular, it relates to an adhesive-bond method for bonding separator strips and fresh terrazzo installations to cured concrete or other subsurfaces wherein a substantial economy and utility are provided over the prior art. More particularly, it relates to the use of novel adhesive compositions in a new process for the laying and bonding of separator strips and the laying and bonding of freshly poured thin terrazzo surfaces directly to cured concrete or other subsurfaces. Still more particularly, it relates to the use of novel adhesive compositions and the process for installing separator strip and thin terrazzo surfaces whereby a significant economy of labor and materials is effected and whereby terrazzo surfaces may be laid directly upon above grade cured concrete or other surfaces in ordinary structures, wherein terrazzo surfaces could not be placed by conventional procedures, as well as upon sub-grade and upon at-grade surfaces.

The art has long sought a satisfactory method for laying terrazzo surfaces on the above-grade subsurfaces of structures which are not sufficiently reinforced to support the weight of a terrazzo installation. In addition, the art has also endeavored to devise a method for laying terrazzo directly on a variety of moist or dry subsurfaces, including cured and old concrete and also whereby the weight of the terrazzo installation would be substantially reduced below that required by the methods currently used in the art. Still further, a method has been needed whereby the cost of the labor and materials required to install a satisfactory terrazzo installation would be substantially reduced below that required by methods currently used in the art.

Terrazzo is known for its durability and beauty as a surface composition. Its wear qualities are outstanding when compared to other surfaces, such as wood, plastic, polymer coated surfaces, asphalt tile, rubber tile, concrete, ceramic surfaces, slate, flagstone and marble. Terrazzo surfaces, moreover, are unsurpassed in regard to the comparable ease of maintenance required to provide an attractive durable surface therewith. Terrazzo installations can be ground to form attractively polished surfaces which become even more highly polished with wear and which require only damp mopping or washing to be kept in a clean and attractive condition. The load bearing and wearing characteristics of terrazzo installations are also outstanding, being comparable to such strong and durable surfaces as natural stone and steel or other metals. It is a substantial advantage, therefore, to now be able by means of the process of the present invention to extend the utility of terrazzo to its use on subsurfaces which formerly could not receive a terrazzo surface, either because the subsurfaces were not sufficiently reinforced or were not of such inherent strength as to safely support the weight of the conventional type of terrazzo installation, or also because the cost of installation of conventional terrazzo prohibited its use in the desired application.

Therefore, it is an object of the present invention to provide a method for the laying of terrazzo directly upon moist or dry cured concrete or other subsurfaces.

A further object of this invention is to provide a method for the laying of an especially thin true terrazzo surface, although relatively thick terrazzo surfaces may also be installed using the method of this invention.

2

Still further, it is an object of this invention to provide a method for the laying of true terrazzo on above grade or suspended floors or other surfaces instructures wherein the state of support strength is such as to normally prohibit a conventional terrazzo installation.

It is a further object of this invention to provide a method for the laying of true terrazzo whereby a significant economy in labor and material costs is effected.

Another object of this invention is to provide a method for laying true terrazzo whereby the terrazzo surface thus provided will be of at least such durability, beauty and utility as may be afforded by terrazzo surfaces which are installed using those methods presently known to the art.

Other objects of this invention are inherent in or will become apparent from the following explanations and examples.

There are four general methods for the laying of terrazzo now known to the art, i.e., the conventional method, the sand-cushion method, the monolithic-system method, and the latex method.

According to the conventional method wherein terrazzo is laid on a concrete subsurface, the laying of the terrazzo must take place within 24 to 48 hours of the pouring of the concrete subsurface. This method, therefore, is not used and cannot be used for laying terrazzo topping directly on old or cured concrete or other subsurfaces. In order to use this method and obtain the desired adhesive bonding of the terrazzo to the subsurface, the concrete subsurface must always be in an incomplete state of cure. This method is commonly used in new structures. In the procedure of this conventional method, a minimum 1⅛" concrete underbed is poured onto a structural slab, which may also be in an incomplete state of cure when the underbed is poured to facilitate the bond between the slab and the underbed. While the underbed is still in a plastic state, 1¾" deep metal divider strips are set at least 1⅛" deep into the underbed to form squares or rectangles of a minimum of one foot to a maximum of six feet in width and length. Within 24 to 48 hours of the laying of the underbed the terrazzo topping is poured to a minimum depth of ⅝ inch. The total minimum depth of underbed and terrazzo therefore is 1¾".

With the sand cushion method, the laying of a required underbed and terrazzo topping can only be done on concrete subsurfaces that are structurally strong enough to bear the weight of the installation. This method is commonly used, therefore, only on the sub-grade or on-grade surfaces of new or older structures since, because of the great weight of the installation, it can only be used on suspended or above-grade surfaces of structures which are of unusually heavy or reinforced construction. In this method, a minimum ¼-inch bed of sand is laid over the subsurface. Tar paper and a light reinforcing metal mesh is next laid over the sand. Onto the tar paper there is then poured a minimum of 2⅛" of concrete to form an underbed. While the underbed is still in a plastic state of cure, divider strips are imbedded in it, as was described for the conventional method. Within 24 to 48 hours of the laying of the underbed, the terrazzo topping is poured to a minimum depth of ⅝". The total minimum depth of the sand, underbed and terrazzo, therefore, is 3 inches and the depth of only the concrete underbed and terrazzo is 2¾ inches.

According to the monolithic system method, the laying of an underbed and terrazzo may be made directly over earth or other fill. This method can be used, however, only for new, at-grade construction installations and only in those geographical areas where the temperatures do not fluctuate too much, such as in the southern part of the United States. In the monolithic system method, a 1-inch minimum concrete sub-bed is poured on top of earth or other fill. A layer of reinforcing metal mesh is then placed on the sub-bed. On this mesh and within 24 hours of the pouring of the sub-bed, a concrete underbed of a minimum depth of 1⅜ inches is poured. Strip separators are not usually used in this type of installation. Within 24 to 48 hours of laying the underbed, a terrazzo topping of at least ⅝ inch is laid. The total minimum depth of sub-bed, underbed and terrazzo, therefore, is 3 inches. In the case of the usual installation, the concrete sub-bed is 3 inches in depth, thus increasing the total depth of the installation to 5 inches.

A combination of the features of the conventional and sand cushion methods is also used sometimes, e.g., over wooden surfaces. For example, the sand may be omitted but tar paper, underbed and terrazzo would be used to produce an installation having a 1¾ to 1⅞ inch minimum underbed and a ⅝-inch minimum terrazzo topping for a total of 2⅜ inches minimum depth for the installation.

Using the latex method, a latex-terrazzo composition can be laid atop a variety of subsurfaces. In the trade, however, this composition is not recognized as a true terrazzo and is generally not as acceptable as true terrazzo because of the relatively high rate of bond failure with this type installation. The latex-terrazzo composition does not polish to a high sheen when ground or upon wear as does true terrazzo and furthermore, its wear properties are inferior to those of the traditional marble-chip and Portland cement concrete composition of which true terrazzo is formed. In the practice of the latex method, 3 to 5 gallons of a rubber latex are added per each 94 lb. bag of cement and the required amount of marble chips needed to form the desired latex-terrazzo composition. The rubber latex that is used is normally about 50% solids and 50% water. Generally, the subsurface to be treated with this latex method is first heavily coated with quantities of the rubber latex alone and a particularly heavy layer of the rubber latex is set down along the lines set up for the divider strips. "T" shaped divider strips are pressed head-down into the drying latex and are painted over with another heavy coating of the rubber latex. The latex-terrazzo topping composition, prepared as described above, is then poured over the divided subsurface to a minimum depth of ⅜ inch.

In the practice of the process of the present invention, novel concrete adhesive compositions are used to bond true terrazzo to a variety of sub-surfaces including cured or old, moist or dry concrete, to form thin terrazzo surfaces having a minimum depth of ⅜ inch. A concrete underbed is not required in this novel process and therefore a time limit after the laying of such an underbed, wherein the terrazzo must be laid, is not imposed, as is the case with the methods known to the art to date. By being able to lay relatively very thin terrazzo surfaces, the advantage of weight reduction thereby gained permits the use of terrazzo on above-grade surfaces of structures which are not of a heavy or reinforced type construction. In addition, the use of relatively thin terrazzo installations tends to minimize the amount of surface grinding required to a degree much below that required for conventional terrazzo installations in as much as more aggregate per unit surface area initially shows in the thin topping than in the conventional toppings.

According to the process of the present invention, the subsurface is first swept or washed clean of loose debris, grease, oils, paint or other coatings to expose a clean porous surface. Divider strips are not required in the practice of the present invention, however, where they are desired to effect ornamental design, or where divider expansion joints must be laid they are set down as follows: along the lines where the strips are to be set, the clean subsurface is marked with chalk; along the chalk lines, at intervals of about one foot there are placed small blobs of a mixture of a suitable adhesive which may be the novel concrete adhesive composition disclosed below and sand, in the ratio of approximately 1:3 to 1:5 respectively; "T" shaped separator or expansion strips of ⅜ inch in depth are then pressed head-down into the adhesive/sand composition and where depressions are present in the sub-surface the strips are elevated above the depression to form a uniformly planar surface and are bonded to the subsurface by the blobs of adhesive-sand composition described above. Sufficient cure of the adhesive/sand composition is effected in from 3 to 16 hours to permit the laying of the terrazzo. Typical adhesive-terrazzo installations that are installed by the process of the present invention may have strips set at 6 to 20 feet intervals, although they may be as close together as one foot, or the installation may require no strips at all.

The novel concrete adhesive to be used to bond the terrazzo topping to the subsurface is then sprayed, brushed, broomed or trowelled onto the subsurface to form a 5 to 15 mil coating thereon. The adhesive is then permitted to cure until such time as it ceases to be fluid and becomes tacky; this usually requires about one-half to three-quarters of an hour. The terrazzo topping is now poured over the adhesive coated subsurface to a minimum depth of ⅜ inch. It is then screeded, trowelled, rolled and permitted to set. Between three and 7 days after the terrazzo is poured, the topping is ground to provide a surface showing a minimum of 70% aggregate per unit area.

The novel concrete adhesives which are to be used in the process of the present invention for bonding the terrazzo topping to the concrete subsurface are those revealed in the copending application entitled "Concrete Adhesive Compositions," Serial No. 119,007, filed March 31, 1961, in the name of Anthony J. Simonson. The contents of that copending application are incorporated herein by reference. In laying strip the adhesive should contain no more than 15% solvent w./w. to prevent excessive shrinkage. The adhesive compositions mentioned in the copending application can be used for this purpose as well as straight polyester adhesives. In laying the terrazzo, the adhesive used should preferably be of a brushable, sprayable or broomable consistency for ease of application. When less than approximately a 5-mil thick coating of the adhesive is used, not enough of the adhesive is present to form a consistently good bond and where more than approximately a 15-mil thick coating is used, the rate of cure of the adhesive is considerably slowed down, thus delaying the laying of the terrazzo.

Terrazzo mixes of marble aggregate, which are usually not in excess of ⅜ inch on one side, and Portland cement are used to form the terrazzo installation compositions in the practice of the present invention. The aggregate/cement mixes may be of any of the conventional formulations used by those in the art, such as those recommended by the National Terrazzo and Mosaic Association, Inc., 711 14th Street, N.W., Washington 5, D.C. They may contain, in addition to marble chips, cement and water, pigments, and/or abrasive grits to impart color and/or better traction to the surface.

The novel adhesive compositions to be used in the process of the present invention, as noted above, are disclosed in the copending application "Concrete Adhesive Compositions." As disclosed in that application these novel adhesive compositions are prepared as a two part system prior to their actual use. One part, (Part A) contains mercapto-terminated liquid polysulfide polymers which have a molecular weight of about 500–1000, solid fillers, and cure accelerating agents, blended into a uniform mixture with an aliphatic organic solvent vehicle. The other part, (Part B), contains liquid and/or solid epoxy resins and solid fillers also blended into a uniform mixture with an aliphatic organic solvent vehicle. The two parts of the adhesive composition are then mixed in such a ratio as to provide about a 1:1 to 2.5:1 epoxy: polysulfide weight concentration in the blend. The two part mixture is then diluted with an additional 5 to 25% by volume of aliphatic organic solvents to provide an adhesive of brushable consistency. The order for adding and mixing the two parts, A and B, and the additional solvent is not important to the operation of this invention, so long as a uniform mixture is obtained.

Many commercially available epoxy resins may be used in these novel adhesive compositions. In general, epoxy resins, solid and liquid, having epoxy equivalents of about 150 to over 2,000, and, in the case of liquids, having viscosities (in 40% butyl carbitol) of about A to $Z_2$ according to the Gardner Holdt method (ASTM D555–54) can be employed in this regard. Liquid epoxies, having these properties, such as those which are available under the designations Tipox resin B, Tipox resin C and Tipox resin E and which are marketed by Thiokol Chemical Corporation; ERL 2774, ERL 3794 and ERL 2772 which are marketed by Union Carbide Corporation; Epon 920, Epon 828, and Epon 826 which are marketed by Shell Chemical Company; Der 331 and Der 332 which are marketed by Dow Chemical Company; Epi-Rez 510 which is marketed by Jones-Dabney Company; and Gen Epoxy 190 which is marketed by General Mills can be used in the novel compositions of the present invention. Solid epoxy resins having the above described properties are sold under the names EKRA 2002, and EKRD 2003 by Union Carbide Corporation; Der 661, Der 664, and Der 667 by Dow Chemical Company; Epi-Rez 515, Epi-Rez 522, Epi-Rez 530 and Epi-Rez 540 by Jones-Dabney Company; Araldite 6071, Araldite 6075, Araldite 6084 and Araldite 6097 by Ciba Co., Inc. This list is not intended to be exhaustive, but merely illustrative.

Epoxy resins, however, may not be used by themselves for the bonding of cured concrete to new concrete or terrazzo installations, because upon cure they become too brittle. When the compositions of the copending application are used, however, the epoxies are chain extended during the curing operation and are flexibilized by mercaptan-terminated polysulfide polymers. It has been discovered, according to the present invention, that weight/weight ratios of polysulfide to epoxy of of about 1:2.5 to of about 1:1 are necessary to obtain the best results. Where less than of about 1:2.5 parts of polysulfide to epoxy are used the resultant composition becomes too brittle upon cure to stand up well, without cracking, when subjected to heavy traffic such as may be encountered on a concrete highway which has been resurfaced or repaired, or when the topping and/or the subsurface are subjected to sudden temperature changes and concommittant shrinkages or expansions. Where greater than of about 1:1 parts of polysulfide to epoxy are used, the resultant compositions, upon cure, have too low a tensile strength to provide a long-life serviceable bond under the usual stresses to which it may be put.

The liquid polysulfide polymers which are suitable for use in the present invention and revealed in the copending application are mercaptan-terminated and of about 500 to 1,000 number average molecular weight. Useful commercial polysulfide polymers having these properties include those marketed by Thiokol Chemical Corporation under the designations LP-3, LP-33 and LP-8.

Although many cure accelerating agents are available for use with epoxies, only two have been found useful thus far for use in the compositions disclosed in the co-pending application. They are tri(dimethylaminomethyl) phenol and a mixture of at least 40% DMP-30, by weight, with dimethylaminomethyl phenol. In compositions useful for the repair or the laying of terrazzo surfaces, where the adhesive coated cured concrete surface is to be covered with a minimum of ⅜ inch of terrazzo mix, and where the relative rates of cure of the adhesive composition and the terrazzo should be close, tri(dimethylaminoethyl) phenol, used alone, is the preferred cure accelerator. For the patching, repair and resurfacing of cured concrete installations where a fresh concrete surface of relatively slight thickness is to be bonded to the cured concrete installation, different combinations of tri(dimethylaminoethyl) phenol and dimethylaminomethyl phenol may be used as is disclosed in Table I, depending upon the temperature.

TABLE I

| Temperature ° F. | Ratio tri(dimethylaminomethyl) phenol/ dimethylaminomethyl phenol |
| --- | --- |
| ≥90 | 2:3 |
| ≥70 | 1:1 |
| ≥60 | 7.5:2.5 |
| <60 | 1:0 |

When the two recommended cure accelerators are used in the adhesive compositions disclosed in the copending application, the cure rates of these compositions are such that serviceable bonds and surfaces are obtained in about 12 hours for the adhesive and in about 16 hours for a ⅜-inch terrazzo topping, at 80° F. and in about 1 to 4 days for the adhesive and in about 20 hours for a ⅜-inch terrazzo topping at 40° F.

It has been found that a suitable concentration of cure accelerator in the adhesive compositions of the present invention is about 10% by weight based on the weight of epoxy used. Where a faster cure is desired, higher percentages of tri(dimethylaminomethyl)phenol by weight when it is used alone, or by proportion, when used with DMP-10, may be used.

A variety of fillers may be used in the compositions disclosed in the copending application. Fillers extend the volume of the adhesive and permit an even higher dilution of the adhesive resins with solvent without impairing the adhesive qualities of the compositions. Where no fillers are used, good adhesive compositions can be obtained; however, in such cases relatively smaller quantities of the solvent must be used so that a brushable or sprayable consistency is produced within the meaning of the present invention. Were such quantities of solvent to be used in an adhesive composition where no fillers were present as the quantities ordinarily used in compositions containing fillers, the resultant non-filler containing compositions would be too fluid, and much of the adhesive would be absorbed into the porous cured concrete subsurface and thus be lost before the required 5–15 mil surface thickness of adhesive could be built up. Where more fillers are used than 80 to 90 weight/weight based on the total weight of Parts A and B supra, the resultant compositions would be either too viscous and thus not brushable, or if further diluted with solvent to be of brushable consistency they would provide too low a concentration of adhesive resin per unit area of surface to produce a good bond. With the presence of polysulfides in the compositions the use of acidic fillers is not desired. Acid fillers may be used, however, if they are incorporated into the adhesive composition within a relatively short time before the adhesive is used. Preferred fillers are of neutral or slightly alkaline nature. Such fillers as the various calcium carbonates, aluminum and other silicates, silicon dioxide, graphite, zinc and other sulfides and lithopone have been successfully used to volume extend the adhesive compositions of the present invention. Fillers of size lower than 300 mesh tend to settle out if they are incorporated into and stored in parts A or B for any great length of time. Generally, the larger the size of the filler particles, the more of the filler that can be used. Up to about 80% of the larger sized fillers can thus be used in these novel adhesive compositions.

In addition to volume extension and a reduction in the cost of the adhesive compositions, other advantages are obtained through the use of fillers. In general, fillers have smaller coefficients of expansion than the cured resins. Thus, when incorporated into adhesive compositions they reduce the overall coefficient of expansion of the compositions. This is important in that bond life may be dependent in part upon the extent of the stresses set up by the different rates of expansion and contraction for cured concrete and for the adhesive when under the same temperature gradient. Fillers are also useful in reducing the exothermic temperatures developed during the cure of the adhesives, probably through some heat dissipation by conduction, since the heat conductivity of the fillers is greater than that of the resins. It is also believed that the fillers often improve the impact strength of the adhesive bonds.

Although many volatile aliphatic solvents may possibly be used in the compositions of the present invention, those having the most utility and therefore the most preferred are the resin miscible, low molecular weight aliphatic ketones having some degree of water solubility, especially acetone, methyl ethyl ketone and methyl isobutyl ketone. The latter group is, in general, compatible in suitable concentrations with both the epoxy and liquid polysulfide polymers used in the compositions of the present invention. The feature of water miscibility is of importance in improving the rate of removal of solvent after the new installation topping is poured as described above and in assuring good bond at low temperature and/or high humidity operating conditions.

Many aromatic solvents that are miscible and compatible with the epoxy and polysulfide resins used in the compositions of the present invention may be used in combination with the aliphatic solvents. The preferred aromatic solvents have boiling points below 130° C., such as xylene, toluene, benzene, etc. The lower the boiling point, the more effective is the removal of the solvent during the "open time."

In preparing the compositions disclosed in the copending application it has been found that a favorable ratio of solvents by weight, from the viewpoint of obtaining a mixable fluidity, in parts A and B respectively is about 3:1. The total weight of solvent used in parts A and B being at most 15% weight/weight based on the total weight of parts A and B.

After Parts A and B are mixed together, an additional 5% to 25% volume/volume of solvents is added to the mixture, based on the combined volume of Parts A and B to impart a brushable, sprayable or broomable consistency to the final composition.

Preferred compositions of the present invention, therefore, contain epoxy and polysulfide resins in a weight ratio of about 1:1 to 2.5:1 epoxy:polysulfide. Each of these components is kept separate from the other until the time of use. Cure agents may be tri-(dimethylaminomethyl) phenol, or a mixture of tri(dimethylaminomethyl)phenol and dimethylaminomethyl phenol in at least a 2:3 ratio dependent upon the ambient temperature as noted above in Table IV. The cure agents are also kept separate from the epoxy resins until the time of use and are present in concentrations of about 10% to 15% by weight of the epoxy resins. Solid fillers may be present in weight percents of up to about 80 to 90% based on the total weight of the resins, cure agents, fillers and solvents present in Parts A and B prior to the final dilution. The solvent vehicle may consist of one or more resin miscible aliphatic, volatile ketones used alone or in combination with aromatic solvents. The preferred method for preparing the compositions is to mix as one part only the polysulfides, cure agents and some or all of the fillers with enough of the solvents to permit adequate blending of these components. The epoxy resins, some or all of the fillers and enough solvents to permit adequate blending of this latter set of components are separately mixed as a second part. The total weight of solvents in both the first and second parts being no more than 15% by weight of the total of the two parts. The first and second parts are then finally blended with an additional 5% to 25% of solvents by volume to yield a brushable composition. This is applied to a clean cured concrete surface so as to provide a 5–15 mil coating theron and it is permitted to be exposed to the atmosphere until it becomes sticky and it is then coated with the fresh concrete or terrazzo installation.

The following examples are merely illustrative of the novel process of the present invention and are ont intended as a limitation upon the scope thereof.

*Example 1*

A thin terrazzo topping was layed as the flooring in a newly constructed suite of offices that was at an on-grade suspended surface in a new office building in Washington, D.C. Ambient temperatures were about 40° F. and the ambient humidity was about 50%. In all some 2,200 sq. ft. were covered. The cured concrete supporting slabs were first cleaned of loose debris. Chalk lines were set down dividing the floor area into rectangles 7' x 8'. A concrete adhesive containing 200 p.b.w. of a liquid epoxy resin, Tipox resin B, sold by Thiokol Chemical Corporation having an epoxide equivalent of about 185 and viscosity of about 10,000 poises at 25° C., 150 p.b.w. of LP–3 mercaptan-terminated liquid polysulfide polymer sold by Thiokol Chemical Corporation, 24 p.b.w. of the cure agent tri(dimethylaminomethyl)phenol, 79 p.b.w. of toluene and 360 p.b.w. of aluminum silicate filler were mixed 1:3 by volume with sand. Blobs of this adhesive-sand mixture were set down on the chalk lines with a separation of about one foot between adjacent blobs. "T" shaped divider strips, ⅜-inch in height, were then set down on the chalk lines, head-down, and after shimming to produce a planar surface were pressed firmly into the supporting blobs of adhesive and sand. They were permitted to set overnight. The concrete surface was then mopped until moist with clear water and standing water was removed. The moist concrete surface was then coated to a thickness of 5 to 15 mils with a concrete adhesive which was of the same composition except for the sand component as that used for laying the stripping, but which contained an additional 20 p.b.vol. of acetone to make it of broomable consistency. The adhesive coating was permitted to set for three-quarters of an hour open to the atmosphere to permit the solvent to evaporate and the adhesive to cure to a sticky state. Marble chips of No. 0, No. 1 and No. 2 size were then broadcast over the adhesive to permit workmen to walk over the coating without damaging it. A topping, composed of a 1:2 weight/weight mixture of Portland cement to No. 0, No. 1, and No. 2 size marble chips, mixed with sufficient water to make it workable, was then poured onto the adhesive coating to a depth of ⅜ inch, and screeded, trowelled and rolled into a planar surface. After the terrazzo had set sufficiently the floor was rough ground with a No. 30 grit stone and washed clean with clear water. The voids produced by rough grinding were grouted with Portland cement which was then passed over with a No. 80 grit stone. Within 72 hours after grouting the excess grout was removed and fine grinding was effected by rubbing the floor with a No. 80 grit stone to reveal no less than 70% marble chips at the surface. At the end of eleven days following the laying of the terrazzo surfacing, approximately 2,000 sq. ft. of the installation had become delaminated. Upon ripping out this defective topping the odor of toluene was plainly detected.

*Example 2*

The defectively bonded terrazzo topping of Example 1 was removed and the concrete subsurface was cleaned to permit the installation of a new terrazzo flooring. The ambient temperature was raised to about 60° F. and the ambient humidity was about 40% relative. The 2,000 square foot area was divided approximately in half. The stripping was replaced in one of the two 1,000 square foot areas using the method and adhesive composition described in Example 1 for laying stripping. The stripping in the second 1,000 square foot area was also replaced using the method described in Example 1 but the adhesive composition used in this case was only made with acetone, no toluene was used. The new terrazzo topping was then installed, using the procedure described in Example 1 for both 1,000 square foot areas. The adhesive composition used in this step of the procedure on the first of these 1,000 square foot areas was the same as that used for coating the supporting slabs in Example 1. The adhesive composition used on the second of the 1,000 square foot areas, was different than that used in Example 1 in that only acetone was used as the solvent.

Subsequent inspections have disclosed that a firm bond resulted from this combination of operating conditions and adhesive compositions.

*Example 3*

A thin terrazzo flooring was layed upon an on-grade concrete surface of approximately 6,000 sq. ft. in a newly constructed high school in Lakewood, New Jersey. This occurred during the summer when prevailing ambient temperatures were about 80° F., and ambient relative humidities were between 50 and 100% relative.

The process used was that of Example 1, however, the adhesive composition used acetone instead of toluene.

Sound, polished load bearing surfaces were produced.

*Example 4*

Another concrete surface in a high school in Franklin Township, N.J. was surfaced on-grade with some 35,000 sq. ft. of a thin terrazzo installation by the method described in Example 1. The adhesive composition used was that described in Example 3.

Sound, polished load bearing surfaces were produced. The ambient temperature and relative humidity during installation were 70–80° F. and 80%, respectively.

*Example 5*

The floor of a ballroom and the floors of several banquet rooms of a motel in Pennsylvania which were at a sub-grade level were surfaced with a thin terrazzo topping by the method described in Example 1. The adhesive composition used was that of Example 3. Some 6,000 sq. ft. were covered and a sound flooring was produced.

Ambient temperature and relative humidity during the installation were 50° F. and 80%, respectively.

*Example 6*

A suspended on-grade thin terrazzo flooring was installed over some 6,000 sq. ft. in a restaurant in New York, using the method of Example 1 and the adhesive composition of Example 3. The ambient temperature and relative humidity at the time of installation were 65° and 50%, respectively. Sound, serviceable, load bearing surfaces were thereby produced.

It is usual to add fillers to provide the beneficial properties described above, and wherever possible to use a maximum amount permissible by the particular formulation and end use desired. While for storable long life an incorporation of only up to 60% weight/weight of fillers in components A and B of the copending application provides for stable mixtures, just prior to use when parts A and B are mixed together with the additional organic solvents to form a brushable consistency, additional fillers, especially of larger particle size, i.e., above 12 microns, may be added to bring the total concentration of fillers in the adhesive compositions up to 80 to 90% by weight of parts A and B as set down on the subsurface.

The above stated range of epoxide equivalents for the epoxy resins usefully employed in adhesive compositions of the copending application, 150 to over 2,000, encompasses both liquid and solid epoxy resins. However, among the solid resins one often finds the epoxide equivalents to be in the range of approximately 2,000 to 4,000 and solid resins having these higher epoxide equivalents can be used in the present invention.

While the compositions of the copending application find widespread utility in bonding fresh concrete or terrazzo to Portland or bituminous cement concrete subsurfaces, the bonding of such toppings to other porous and non-porous composition subsurfaces may be conveniently done using the compositions and process of the present invention. Other typical subsurfaces include wood, iron, steel, aluminum, copper, zinc and other metals, glazed tile, vitrified tile, ceramic tile and other heat fired surfacing materials, glass, marble, granite and other natural stone, vinyl tile, asphalt tile, linoleum, rubber tile and other natural and synthetic polymer surfaces.

I claim:
1. A process for installing an installation selected from the group consisting of concrete and terrazo installations onto a base structure comprising coating the surface of said base structure with an adhesive composition consisting essentially of approximately 100 to 400 parts by weight of at least one liquid polysulfide resin, approximately 100 to 2,000 parts by weight of at least one epoxy resin, approximately 8 to 300 parts by weight of at least one amino phenolic cure agent, approximately 40 to 400 parts by weight of at least one aliphatic ketone solvent and up to 8,000 parts by weight of at least one filler; causing said adhesive compositions to cure to a tacky state and applying said installation in a plastic uncured state to a desired depth over the adhesive composition coated base whereby, upon the complete curing of said adhesive composition and said installation said base structure will be bonded to said installation.

2. A process as in claim 1 further comprising conducting said installing under such environmental conditions that the ambient temperature is between 40° F. and the boiling point of said solvent and the relative humidity is between 0 and 100%.

3. A process as in claim 1 further comprising conducting said installing under such environmental conditions that the ambient temperature is between 50° F. and the boiling point of said solvent and the relative humidity is between 0 and 100%.

4. A process as in claim 1 further comprising cleaning the surface of said base structure prior to coating said surface with said adhesive composition.

5. A process as in claim 1 further comprising moistening the surface of said base structure prior to said coating with up to 2% moisture based on the concentration of said adhesive.

6. A process as in claim 1 in which at least one of said ketones is selected from the group consisting of acetone, methyl ethyl ketone and methyl isobutyl ketone.

7. A process as in claim 1 in which said ketone solvent is diluted up to 50% with at least one aromatic solvent.

8. A process as in claim 7 in which at least one said aromatic solvents is selected from the group consisting of toluene, xylene and benzene.

9. A process as in claim 1 in which the surface of said base structure is coated with a 5 to 15 mil coating of said adhesive composition.

10. A process for installing an installation selected from the group consistng of concrete and terrazo installations onto the surface of a base structure comprising cleaning the surface of said base; spacially applying bonding quantities of a separator strip adhesive composition to the surface of said base structure; bonding separator stripping to the surface of said base by means of said separator strip adhesive composition; moistening the surface area of said base structure which is not covered with said separator stripping; coating the moistened surface area of said base structure with a 5 to 15 mil coating of an installation adhesive compositon consisting essentially of approximately 100 to 400 parts by weight of at least one liquid polysulfide resin, approximately 100 to 2,000 parts by weight of at least one epoxy resin, approximately 8 to 300 parts by weight of at least one aminophenolic cure agent, approximately 40 to 400 parts by weight of at least one aliphatic ketone solvent and up to 8,000 parts by weight of at least one filler; causing said installation adhesive composition to cure a tacky state and applying said installation in a plastic uncured state to a depth of at least approximately 3/8" over the installation adhesive composition coated base structure to at least substantially embed said separator stripping in said installation whereby, upon the complete curing of said installation adhesive composition and said installation, said installation and the separator stripping embedded therein will be bonded to said base structure.

11. A process as in claim 10 in which said separator strip adhesive composition contains up to 15% by volume of solvent.

12. A process as in claim 1 in which said base structure is concrete.

13. A process as in claim 10 in which said base structure is concrete.

14. A process as in claim 1 further comprising rough grinding, grouting and polishing said installation.

15. A process as in claim 10 further comprising rough grinding, grouting and polishing said installation.

16. A process as in claim 10 in which at least one of said ketones is selected from the group consisting of acetone, methyl ethyl ketone and methyl isobutyl ketone.

17. A process as in claim 10 in which said ketone solvent is diluted up to 50% with at least one aromatic solvent.

18. A process as in claim 17 in which at least one of said aromatic solvents is selected from the group consisting of toluene, xylene and benzene.

19. A process as in claim 10 in which the surface of said base structure is coated with a 5 to 15 mil coating of said adhesive composition.

References Cited by the Examiner

UNITED STATES PATENTS

| | | | |
|---|---|---|---|
| 1,131,740 | 3/1915 | Schwarz | 18—60 |
| 2,347,233 | 4/1944 | Abernathy | 18—60 |
| 2,751,775 | 6/1956 | Sergovic | 18—60 |
| 2,954,301 | 9/1960 | Szukiewicz | 264—36 |
| 3,038,393 | 8/1962 | Nagin | 50—268 |

FOREIGN PATENTS 245,154    11/1960    Australia.

OTHER REFERENCES

Rooney et al.: Epoxy Adhesives As Structural Repair Material, Journal of American Concrete Institute, August 1957, page 173 relied upon.

ROBERT F. WHITE, *Primary Examiner.*

WILLIAM STEPHENSON, ALEXANDER H. BRODMERKEL, *Examiners.*